July 4, 1967  E. HASALA  3,329,475

VISUAL DISPLAY

Filed Sept. 27, 1965  3 Sheets-Sheet 1

INVENTOR.
ERNEST HASALA
BY Hopgood Mitchell Murtha
and Anderson
ATTORNEYS

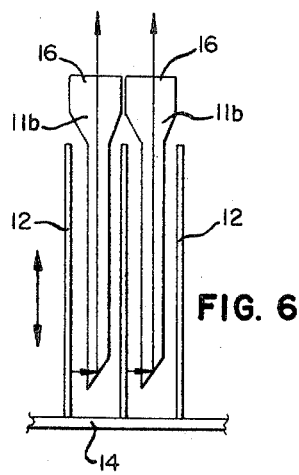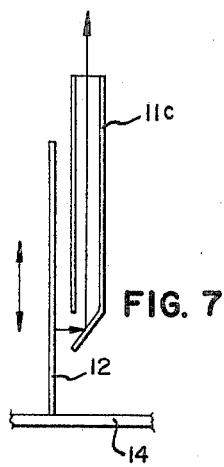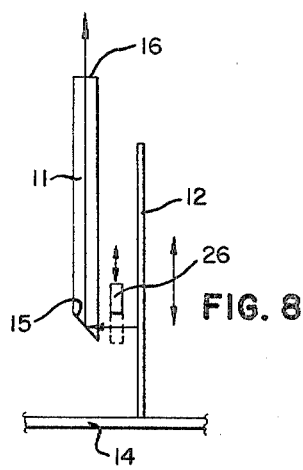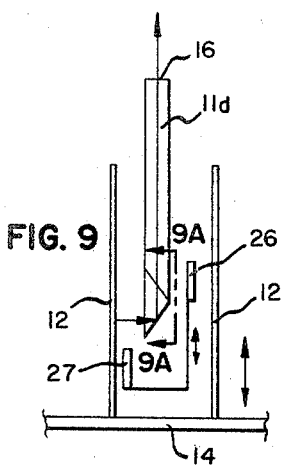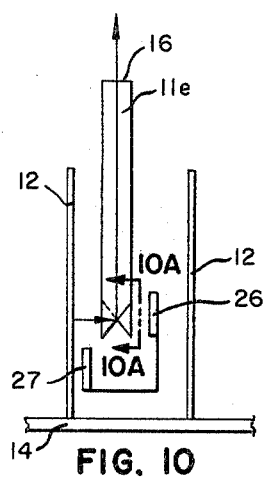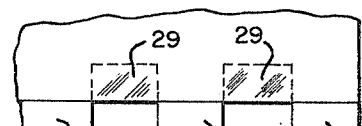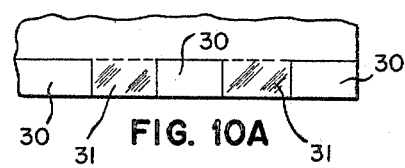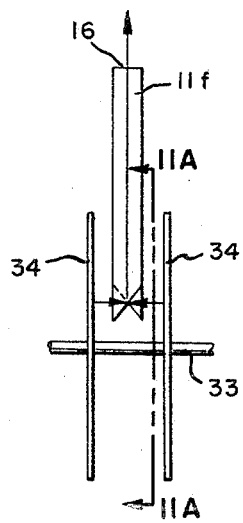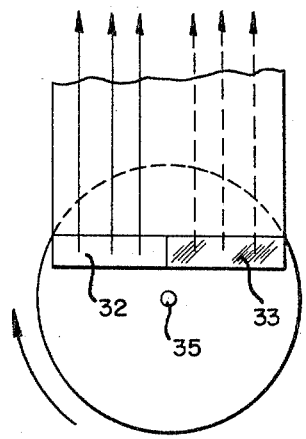

July 4, 1967  E. HASALA  3,329,475
VISUAL DISPLAY
Filed Sept. 27, 1965  3 Sheets-Sheet 3

INVENTOR.
ERNEST HASALA
BY Hofgren, Wegner, Mitchell, Murtha
and Anderson
ATTORNEYS United States Patent Office 3,329,475
Patented July 4, 1967

3,329,475
VISUAL DISPLAY
Ernest Hasala, San Mateo, Calif., assignor to Graphia Inc., San Mateo, Calif., a corporation of California
Filed Sept. 27, 1965, Ser. No. 490,525
12 Claims. (Cl. 352—81)

This invention generally relates to devices for visually presenting a series of pictures to create an animated display.

The present invention, as with any method for reproducing motion through pictures, utilizes a series of split second recordings. These recordings when viewed rapidly in succession create the illusion of recorded movement. The present invention, however, distinguishes from conventional methods of reproducing motion in that the split second picture recordings are decomposed or broken into strips or lines. These strips or lines are then transmitted by internal light reflecting elements onto viewing surfaces which are arranged to synthesize or recompose the pictures. The decomposition of many pictures is stored on record sheets, each sheet illustrating a single line of each picture.

It will be apparent in view of the following description that one object of this invention is to provide a novel form of signs and displays for showing animated visual compositions.

Another object is to provide a visual display wherein a very slow mechanical movement of a recorded program can be used to produce a very rapid exchange of picture units.

It is another object to provide a visual display comprised of a plurality of light transmitting elements, each element having a viewing surface that forms one part of a picture grid, and a program of record sheets interdigitated with the light transmitting elements, these record sheets bearing correlative information that is simultaneously scanned by the light transmitting elements, respectively.

Another object of the invention is to provide a visual display of the kind described comprising a plurality of light transmitting elements, each element having internal light reflecting means, and means forming a plurality of reflective surfaces for receiving light from a record sheet on one side of an element, respectively.

Another object is to provide a visual display of the kind described having light reflective surfaces associated with light transmitting elements, respectively, said reflective surfaces being mounted for alternate positioning to selectively reflect light from a record sheet on one or the other side of an associated element.

Another object is to provide a visual display of the kind described having both first and second reflective surfaces associated with respective light transmitting elements, one surface being adapted for receiving light from a record sheet on one side of the element and the other surface being adapted for receiving light from a record sheet on the opposite side of the element.

A further object of the invention is to provide a visual display of the kind described and further comprising a plurality of masks disposed intermediate at least certain of said elements and their associated record sheets, said masks being selectively positionable for obstructing light reflections from certain record sheets to associated elements.

Another object is to provide a visual display of the kind described having a program comprised of record sheets bearing information placed thereon in a manner that produces a picture of superior definition.

Another object is to provide a visual display of the kind described wherein each of the light transmitting elements are integrally formed, each element extending generally perpendicular from one surface of a transparent sheet, the other surface of said transparent sheet defining a picture grid.

A still further object is to provide a visual display of the kind described having a pair of picture grids formed respectively with first and second sets of light transmitting elements, both sets of elements being interdigitated with a common set of record sheets that serve as a program for both grids.

Other objects of this invention will become apparent in view of the following detailed description and the accompanying drawings.

In the drawings forming a part of this application and in which like parts are identified by like reference numerals throughout the same.

FIG. 1 is a perspective view of a simplified embodiment of the invention showing a plurality of internal light reflecting elements interdigitated with a plurality of record sheets;

FIG. 2 schematically illustrates one of the light reflecting elements and one record sheet used in the embodiment of FIG. 1;

FIG. 6 shows another form of light reflective element contemplated by the invention;

FIG. 7 illustrates a type of light reflective element having a hollow construction;

Figure 2:
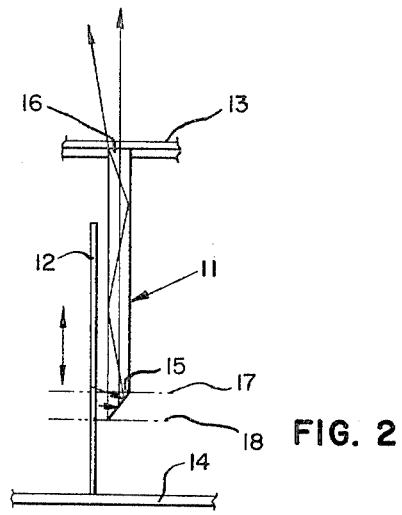
Figure 12:
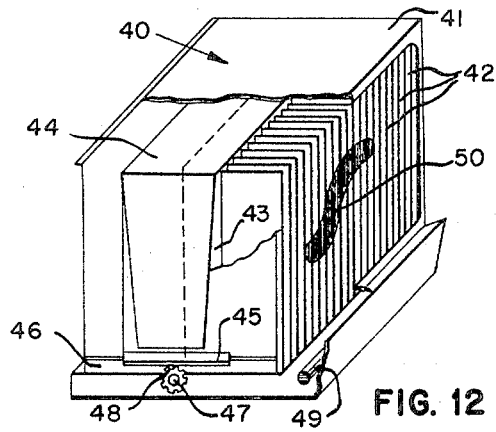
Figure 13:
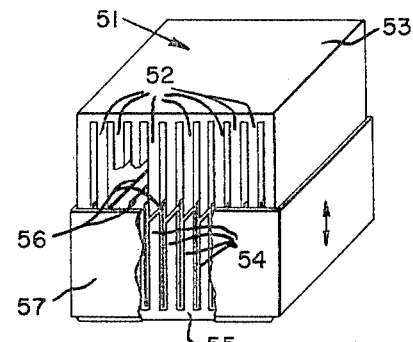
Figure 14:
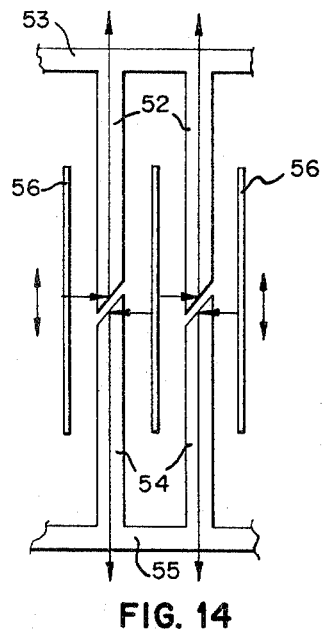
Figure 15:
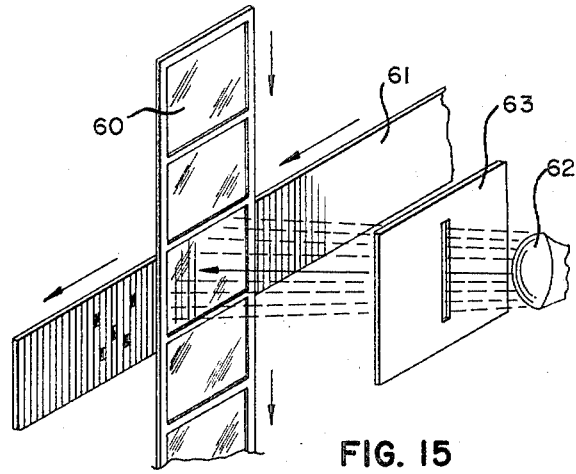
Figure 16:
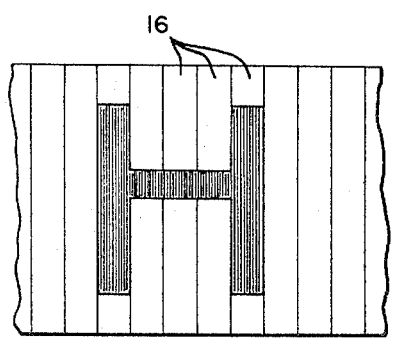
Figure 17:
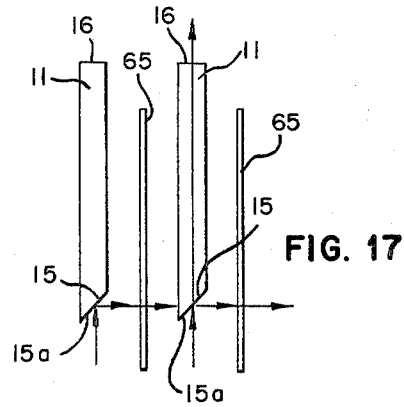

FIG. 8 schematically illustrates the arrangement of a light reflective element and record sheet as shown in FIG. 2, but further illustrating the use of a mask;

FIG. 9 illustrates a light reflective element having reflective surfaces for selectively transmitting the indicia of record sheets disposed on one or the other sides of the element;

FIG. 9a is a detail of the element shown in FIG. 9 as viewed along lines 9a—9a;

FIG. 10 is a second embodiment of a light reflective element having a plurality of light reflective surfaces;

FIG. 10a is a detail of the element shown in FIG. 10 as viewed along lines 10a—10a;

FIG. 11 illustrates an embodiment of the invention having a program comprised of record sheets which are rotated between light reflective elements;

FIG. 11a is an elevation taken along lines 11a—11a of FIG. 11;

FIG. 12 illustrates another form of the invention including mechanical means for reciprocally moving a program of record sheets between light reflective elements;

FIG. 13 is another embodiment of the invention showing light reflective elements that are integrally constructed and capable of transmitting indicia on interdigitated record sheets to pair of picture grids;

FIG. 14 schematically illustrates two pairs of diametrically opposed light reflecting elements as used in the embodiment shown in FIG. 13;

FIG. 15 is a perspective view showing one manner by which record sheets may be produced from conventional film strips;

FIG. 16 illustrates a preferred manner in which indicia is placed on record sheets to form pictures of superior definition; and FIG. 17 schematically illustrates the use of transparent film strips and an internal light source as one means for practicing the invention.

Figure 1:
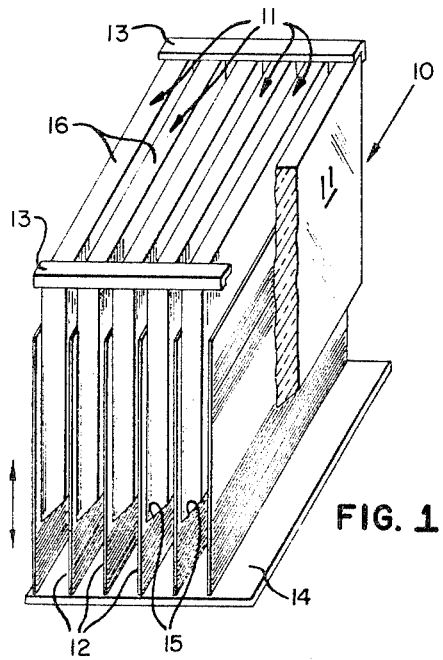

Referring to FIG. 1 there is shown a visual display device 10 generally comprised of a plurality of light transmitting elements 11 and a plurality of record sheets 12, said sheets being interdigitated between the elements. Elements 11 are mounted in parallel, spaced relationship by a pair of corner brackets 13, and each of the record sheets 12 is mounted on edge to a plate 14, which allows the record sheets to be moved simultaneously in a reciprocating manner.

Light transmitting elements 11 are made of solid transparent material such as glass. The lower end of each element is beveled to provide a reflective surface 15 that receives light rays from one side of the element and reflects the rays into and through the element in a manner illustrated in FIG. 2. The internal reflection of light rays may be enhanced by silvercoating the sides of each element, although this is unnecessary since the angles of incidence on the sidewalls will produce almost total reflection. In operation, the light rays are retained within an element until they emerge from the upper end or viewing surface 16. Thus, each light transmitting element 11 defines an internal light reflecting means for transmitting rays from a reflective surface 15 to a viewing surface 16.

The size of the picture (or other information recorded on sheets 12) which can be reflected from surfaces 15 depends on the size of an "optical eye." The term "optical eye" as used herein is defined as the effective opening of an element through which light rays can be received from the surface of a record sheet. The size of an "optical eye" is determined, in general, by the width of the element and the vertical height of reflective surfaces 15, this height being equal to the distance between reference lines 17 and 18 shown in FIGS. 2 and 3. It will be understood that rays of light which emanate from points on sheets 12 that are substantially above line 17 or below line 18 will approach the near surface of the element at an angle of total reflection. It is for this reason, of course, that only narrow bands of information on sheets 12 are reflected off surfaces 15 and transmitted to viewing surfaces 16. However, an "optical eye" may also be created with a mask as to block out light rays which might otherwise penetrate the near surface of an element an be reflected from surface 15.

Referring again to FIG. 1, it will be apparent that each viewing surface 16 will show that picture or information on a record sheet 12 that is associated with its light reflecting element. Moreover, the picture or information that appears by viewing surfaces 16 together is a composite of narrow bands of information on record sheets 12, the narrow band of each sheet being that which occupies a position within the "optical eye" for the associated element. In effect, then, viewing surfaces 16 form a picture grid that illustrates whatever is contained on the program of record sheets 12. The information recorded on each sheet must, therefore, be correlated to information on other sheets such that a change in position of all sheets will constantly present correlative information opposite each "optical eye" of respective elements.

Figure 3:
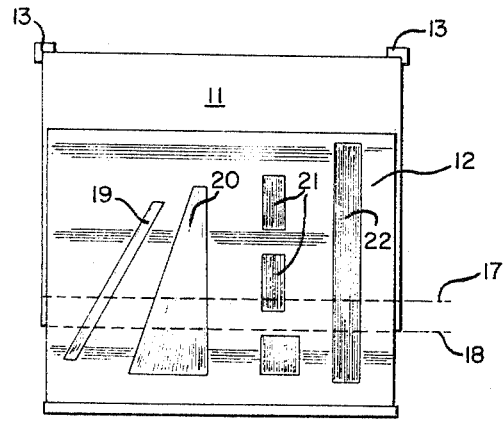
FIG. 3 is a side view of one record sheet positioned in front of a light reflecting element, said record sheet illustrating various forms of indicia that produce different visual effects.

An example of various types of information or pictures which may be created by visual display 10 will best be understood in view of FIG. 3, which shows a record sheet 12 that bears various types of indicia or lines identified by reference numbers 19, 20, 21 and 22. It will be apparent that moving record sheet 12 in an upward direction, as shown, will create the appearance on viewing surface 16 that an object (formed by line 19) is moving progressively from right to left. Simultaneously, the object formed by line 20 appears as if it was increased in size, the increase occurring from right to left only; the objects formed by line 21 would appear intermittently, progressively and for brief periods of duration; and the object formed by line 22 would appear to be the same for all positions into which the sheet 12 is moved.

Figure 4:
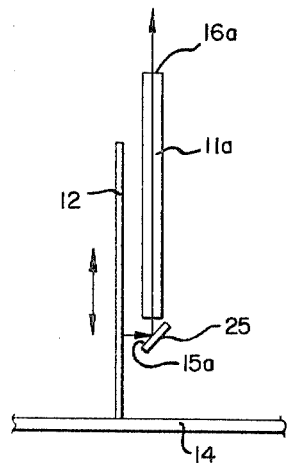
FIG. 4 illustrates a modified form of light reflecting element that may be used in connection with the invention and having means providing a separate reflective surface.

Although the embodiment of FIG. 1 utilizes a reflective surface 15 formed as a part of a light reflecting element, the same effect can be produced by providing separate means for directing light rays into a light reflecting element. Such an arrangement is illustrated in FIG. 4, wherein a light reflecting element 11a is formed with square surfaces at both upper and lower ends. The upper end 16a presents a viewing surface the same as surfaces 16 of elements 11, but the lower end of elements 11a is squared off to transmit light rays that are reflected from a mirror 25 having a light reflective surface 15a.

Figure 5:
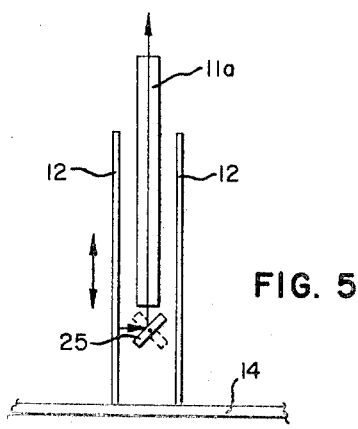
FIG. 5 illustrates a light reflecting element like that shown in FIG. 4, but having means that provides a pivoted light reflective surface for transmitting the indicia of record sheets on one or the other side of the element.

FIG. 5 illustrates a form of the invention similar to that shown in FIG. 4, but having a mirror 25 that is pivotally mounted and positionable in either one of two positions. In the solid line position shown, mirror 25 reflects information recorded on the sheet to the left of the element; pivoting mirror 25 into the broken line position, however, will cause it to reflect information on the sheet to the right of the element. Such an arrangement makes possible the selective use of information on both sides of record sheets 12.

It is contemplated that the light transmitting elements may be tapered or relieved along portions of their length, as shown in FIG. 6, to provide space for housing record sheets 12. This arrangement allows viewing surfaces 16 to be closely positioned as to form recomposed pictures on a picture grid that possesses greater continuity. It is to be understood, of course, that while elements 11b have been relieved on both sides the same result may be achieved by relieving one side only.

Although the preferred forms of light reflecting elements are made of solid transparent material (such as glass or plastics), it is fully contemplated that hollow light transmitting elements might also be utilized. An arrangement of this type is shown in FIG. 7 which illustrates a hollow light reflecting element 11c. Such elements may be formed with polished metal or any material that can be coated to create mirror surfaces within the element.

FIG. 8 of the drawing illustrates a form of the invention wherein a mask 26 is used in combination with light transmitting elements 11 and record sheets 12. Masks of this type may be provided for one, several or all of the light reflecting elements to increase the amount of information that can be stored or create unusual effects. In the solid line position shown in FIG. 8 mask 26 occupies a position allowing information on record sheet 12 to be received and reflected by surface 15 and viewed on the surface 16. However, selective movement of the mask 26 into the broken line position obstructs the "optical eye" of the element, thereby inhibiting a transmission of information which would otherwise be shown. Mask 26 may be constructed as a second source of information related to information contained on other masks for example, or it may be used to simply darken the picture which appears on the viewing surface 16 associated therewith. Obviously, the combined use of record sheets 12 and mask 26 vastly increases the amount of information and number of pictures which may be synthesized on a given picture grid.

FIG. 9 illustrates a form of the invention which utilizes a pair of masks 26 and 27 to selectively shield and expose reflective surfaces on both sides of an element 11d As shown in FIG. 9a, the reflective surfaces 28 on one side are formed at a different elevation than the reflective surfaces 29 on the opposite side. In addition, reflective surfaces 28, 29 are staggered along the width of the element. This arrangement of light reflective surfaces allows information to be transmitted onto the viewing surface 16 from both sides of the element. However, positioning either mask in front of its associated reflective surface will present a picture on viewing surface 16 that is essentially dependent on information transmitted by the other reflective surface. Where the width of reflective surfaces 28 and 29 is relatively small compared with the total width of the element, each piece of information transmitted to viewing surface 16 by reflection on exposed reflecting surfaces may be correlated and viewed as a separate grid picture. Thus, this picture can be rapidly changed simply by moving masks 26 and 27 to positions which alternately obstruct and expose the opposite reflective surfaces. In fact, alternately positioning masks 26 and 27 in front of its associated record sheet and reversing the direction in which sheets 12 are moved may be used to create a picture of continuous movement in one direction on the picture grid defined by viewing surfaces 16.

FIGS. 10 and 10a illustrate an arrangement of light reflective surfaces 30 and 31 similar to that shown in FIGS. 9 and 9a and which are adapted for transmitting pictures from both sides of light reflective elements. The light reflective surfaces 30 and 31, however, are formed at a common elevation on the elements. Here again, the movement of masks 26 and 27 can be synchronized to the movement of record sheets 12 to produce the appearance of continuous directional movement on a picture grid.

FIGS. 11 and 11a illustrate an embodiment of the invention comprising light reflecting elements 11f, having a pair of reflective surfaces 32 and 33 formed on opposite sides of the element, and a pair of record sheets 34 mounted on a rotating shaft 35. In view of FIG. 11a, it will be seen that information from record sheets on both sides of element 11f are transmitted simultaneously to viewing surface 16, and since shaft 35 is located vertically between surfaces 32 and 33, all information that is reflected from either surface 32 or 33 will have the appearance on the viewing surface 16 as being advanced continuously in the same direction.

FIG. 12 illustrates one practical embodiment of the invention in a display device 40 comprising a frame 41 for mounting a plurality of light reflecting elements 42. A program, comprised of record sheets 43 interdigitated with the elements 42, is supported on a U-shaped bracket 44 that carries a pair of spaced racks 45 on its lower ends. These racks are disposed at opposite ends of the display and are guided on slides 46 which are secured to frame 41. A drive shaft 47 extends through the base of the frame 41 and a pair of gears 48, secured to the shaft for rotation therewith, engage racks 45, respectively. Means, not shown, is provided for slowly rotating shaft 47 first in one direction and then the other, thereby causing a reciprocation of racks 45 and its supported U-shaped frame 44, together with the program. A light 49, mounted in the base of frame 41, illuminates the picture grid of elements 42. Thus, light rays are transmitted internally of the elements to portions of record sheets 43 opposite to the "optical eye" of each element. The information on the sheets is, of course, reflected back through the elements and synthesized or recomposed on the viewing surfaces to form a picture, such as indicated by reference number 50.

Another useful embodiment of the invention, shown in FIG. 13, involves a display device 51 that is molded or cast in one piece of plastic, transparent material. This device actually comprises a first set of parallel light reflecting elements 52, formed integrally with an upper transparent grid plate 53, and a second plurality of light-reflecting elements 54 integrally formed with a second transparent bottom grid plate 55. Elements 52 and 54, it will be noted, are aligned in end to end relation, respectively, and both sets of elements are interdigitated by a program comprised of record sheets 56 mounted to a rectangular frame 57. The program as a whole may be moved in directions toward and away from grid plates 53 and 55 in the manner indicated.

FIG. 14 illustrates more clearly the manner in which information on record sheets 56 is transmitted onto the picture grids provided by plates 53 and 55. In this connection the near edges of elements 52 and 54 are beveled or shaped at oblique angles in the same direction. Accordingly, the picture which appears on plate 53 will be a synthesis of information contained on one side of record sheets 56 while the picture that appears on plate 55 will be derived from information contained on the opposite side of record sheets 56. While a movement of frame 57 in either direction will produce a simultaneous animated display on both plates 53 and 55, it may be desirable to view the grid picture formed on these plates one at a time. For example, display 51 may be used as a toy or teaching device for illustrating or relating a story, one-half of the story being viewed on the surface of plate 53 and the second half of the story viewed on the surface of plate 55. The program can then be initiated by simply turning the device end for end, placing one or the other of the plates on top. The weight of the frame and program can be used to animate the display at a controlled rate simply by providing frictional engagement between the record sheets and elements, or the program can be operated manually.

The decomposition of pictures into record sheets of the kind described herein can be accomplished in the manner illustrated in FIG. 15. The apparatus shown comprises a conventional film strip 60 having a series of pictures that are advanced, step-wise, in front of a light sensitive negative strip 61. A light source 62 directs parallel rays of light through an optical slit formed in a mask 63, the slit serving the same function as the "optical eye" of an element, and a series of pictures is taken on the negative strip, which is moved synchronously with film strip 60. It will be understood, of course, that a complete program and decomposition of pictures involves the multiple exposure of a plurality of negatives 61, each negative being exposed in front of the mask 63 positioned with its optical slit disposed in front of a different portion of the film strip. The number of negatives required to be made will depend on the size of the optical slit selected as well as the width of the picture.

Record sheets may also be produced simply by reversing the operation of a display device, projecting one picture at a time on a picture grid while using a program of negatives in lieu of record sheets. After each picture is decomposed and recorded, the negatives would be moved to a new position and another picture taken. This process is repeated until all pictures are decomposed into a program recorded on negatives, after which the negatives may be used to form positive record sheets.

FIG. 16 illustrates a preferred manner in which information is placed upon the record sheets. More particularly, it will be noted that the letter H, as shown on the picture grid formed by surfaces 16, is created by using the full width of certain viewing surfaces rather than beginning or terminating the portion of the letter between the edges of one surface. It is desirable, therefore, to form figures or objects on the record sheets that will appear on a grid surface using the fewest number of viewing surfaces. Preparing record sheets in this manner eliminates breaks in the figures which would otherwise be caused by lines between viewing surfaces. Unnecessary breaks in figures should be eliminated to improve definition of the picture.

Although each of the illustrated embodiments previously described are intended to suggest or demonstrate the use of a front light source for illuminating the picture and information on record sheets, the invention also contemplates a rear illumination as shown in FIG. 17. In this embodiment, a beam of light is directed against the bottom reflective surfaces 15a of element 11. The rays of light are, thereby, deflected through negatives 65, which serve as record sheets in this instance. Information on the negatives is then projected against the surfaces 15 of adjacent element 11 and transmitted to viewing surfaces 16.

Although certain preferred embodiments of the invention have been illustrated and described, it is to be understood that various modifications and changes may be resorted to without departing from the spirit of the invention or the scope of the appended claims, and each of such modifications and changes is contemplated. For example, the light reflecting elements may be formed with curved focusing surfaces to improve picture definition on the picture grid or to alter the normal appearance of the picture which would otherwise be transmitted. It is also contemplated that the light reflecting elements may be formed of Plexi-glass or other laminated transparent material to improve definition of projected information. In addition, of course, the reflective surfaces may be variously angled to improve observation of an image on the grid surface from a particular direction, and these and other modifications should be obvious to persons skilled in this art.

What I claim and desire to secure by Letters Patent is:

1. A visual display comprising: a plurality of light transmitting elements, each element having a viewing surface arranged in substantially co-planar relationship to viewing surfaces of other elements, the composite of said viewing surfaces forming a picture grid; means forming a plurality of reflective surfaces for receiving light from one side of said elements, respectively, and reflecting said light into associated elements; and a program comprised of record sheets interdigitated with said elements, said record sheets bearing correlative information arranged to be placed simultaneously before reflective surfaces of associated elements and viewed on said picture grid.

2. The visual display of claim 1 wherein said record sheets bear correlative information for showing progressive movement of a picture viewed on said picture grid while said program is moved relative to said reflective surfaces.

3. The visual display of claim 1 wherein said record sheets bear correlative information for showing an increase in size of objects viewed on the picture grid while said program is moved relative to said reflective surfaces.

4. The visual display of claim 1 wherein said record sheets bear correlative information for showing objects intermittently while said program is moved relative to said reflective surfaces.

5. The visual display of claim 1 wherein the reflective surfaces of light reflective elements are at oblique angles relative to associated record sheets.

6. The visual display of claim 5 wherein said light reflective surfaces are mounted for alternate positioning to selectively reflect light from one or the other side of an associated element.

7. The visual display of claim 1 and further comprising means forming a plurality of second reflective surfaces for receiving light from the other side of said elements, respectively, and reflecting said light into associated elements.

8. The visual display of claim 1 and further comprising a plurality of masks disposed intermediate at least certain of said elements and their associated record sheets, and means for selectively moving said masks to and from positions obstructing light reflections from said record sheets to associated reflective surfaces.

9. The visual display of claim 1 wherein said elements are made of solid transparent material, each element having a reflective surface formed thereon for receiving light from one side of the element and reflecting said light to its viewing surface.

10. The visual display of claim 1 wherein said plurality of light transmitting elements are integrally formed, each element extending generally perpendicular from one surface of a transparent sheet, the other surface of said transparent sheet defining said picture grid.

11. The visual display of claim 1 and further comprising a second plurality of light transmitting elements, each of said second elements having a viewing surface arranged in substantially co-planar relationship to viewing surfaces of other second elements, the composite of said second vewing surfaces forming a second picture grid; means forming a plurality of reflective surfaces for receiving light from one side of said elements, respectively, and reflecting said light into associated elements; said second light reflecting elements being mounted in alignment with the light transmitting elements first mentioned; and further wherein said record sheets bear correlative information arranged to be placed simultaneously before reflective surfaces of associated second elements and viewed on said second picture grid.

12. A visual display comprising: a plurality of internal light reflecting elements, each element having a reflective surface for receiving light from one side of the element and a viewing surface, the viewing surface of one element being arranged in substantially co-planar relationship to viewing surfaces of other elements, the composite of said viewing surfaces forming a picture grid; and a program comprised of record sheets interdigitated with said elements, said record sheets bearing correlative information arranged to be placed simultaneously before reflective surfaces of associated elements and viewed on said picture grid.

No references cited.

JULIA E. COINER, *Primary Examiner.*